United States Patent [19]
Gogan et al.

[11] Patent Number: 5,667,232
[45] Date of Patent: Sep. 16, 1997

[54] DETACHABLE SISSY BAR

[75] Inventors: Donald Michael Gogan, Brookfield; Stephen L. Galbraith; Geoffrey Thomas Williams, both of Mequon, all of Wis.

[73] Assignee: Harley-Davidson Motor Company, Milwaukee, Wis.

[21] Appl. No.: 504,823

[22] Filed: Jul. 20, 1995

[51] Int. Cl.$^6$ ........................................................ B62J 1/28
[52] U.S. Cl. .................. 280/202; 280/288.4; 280/304.4; 292/106; 403/326; 297/243
[58] Field of Search ...................... 280/202, 288.4, 280/290, 304.3, 304.4, 304.5; 180/219; 224/430, 431, 449; 296/65.1; 292/106, 248; 403/325, 326; 297/232, 230.1, 243; 248/225.21

[56] References Cited

U.S. PATENT DOCUMENTS

| | | |
|---|---|---|
| 4,032,189 | 6/1977 | Benavente et al. . |
| 4,679,806 | 7/1987 | Gingline .............................. 403/325 X |
| 4,759,580 | 7/1988 | Berklich, Jr. et al. .................. 296/65.1 |
| 4,773,693 | 9/1988 | Premji et al. .......................... 296/65.1 |
| 4,993,731 | 2/1991 | Fuller . |
| 5,368,409 | 11/1994 | Marzullo et al. ..................... 403/325 X |

FOREIGN PATENT DOCUMENTS 1922  7/1871  United Kingdom .................. 292/106

OTHER PUBLICATIONS

Custom Chrome 1994 Catalog, pp. 108–109.
Harley–Davidson 1991 Accessories Catalog, p. 72.
Harley–Davidson 1995 Parts and Accessories Catalog, pp. 19, 60 and 72.
"Sissy Bars, Racks & Bags," from *Hot Road Bikes*, pp. 67–68, Jan., 1996.
Harley–Davidson 1992 Accessories Catalog, pp. 19 and 63.
Harley–Davidson 1993 Accessories Catalog, pp. 25, 36 and 28.

*Primary Examiner*—Victor E. Johnson
*Attorney, Agent, or Firm*—Michael, Best & Friedrich

[57] ABSTRACT

A sissy bar assembly including a backrest portion and a pair of latching mechanisms mounted on the backrest portion for securing the backrest portion to a motorcycle mount upon movement of the backrest portion toward the mount. The backrest portion includes a pair of side plates each having front recesses engageable with the front mounts, and rear recesses engageable with rear mounts. The latching mechanisms each include a latch member mounted on the side plates movable for pivotal movement between an unlatched position, in which the front recesses are engageable and disengageable with the mounts, and a latched position, in which the front recess is held in engagement with the mounts. The latching mechanisms further include a locking member movable relative to the latch member between an unlocked position, in which the latch member is movable between its latched and unlatched positions, and a locked position, in which the latch member is held in the latched position.

20 Claims, 7 Drawing Sheets

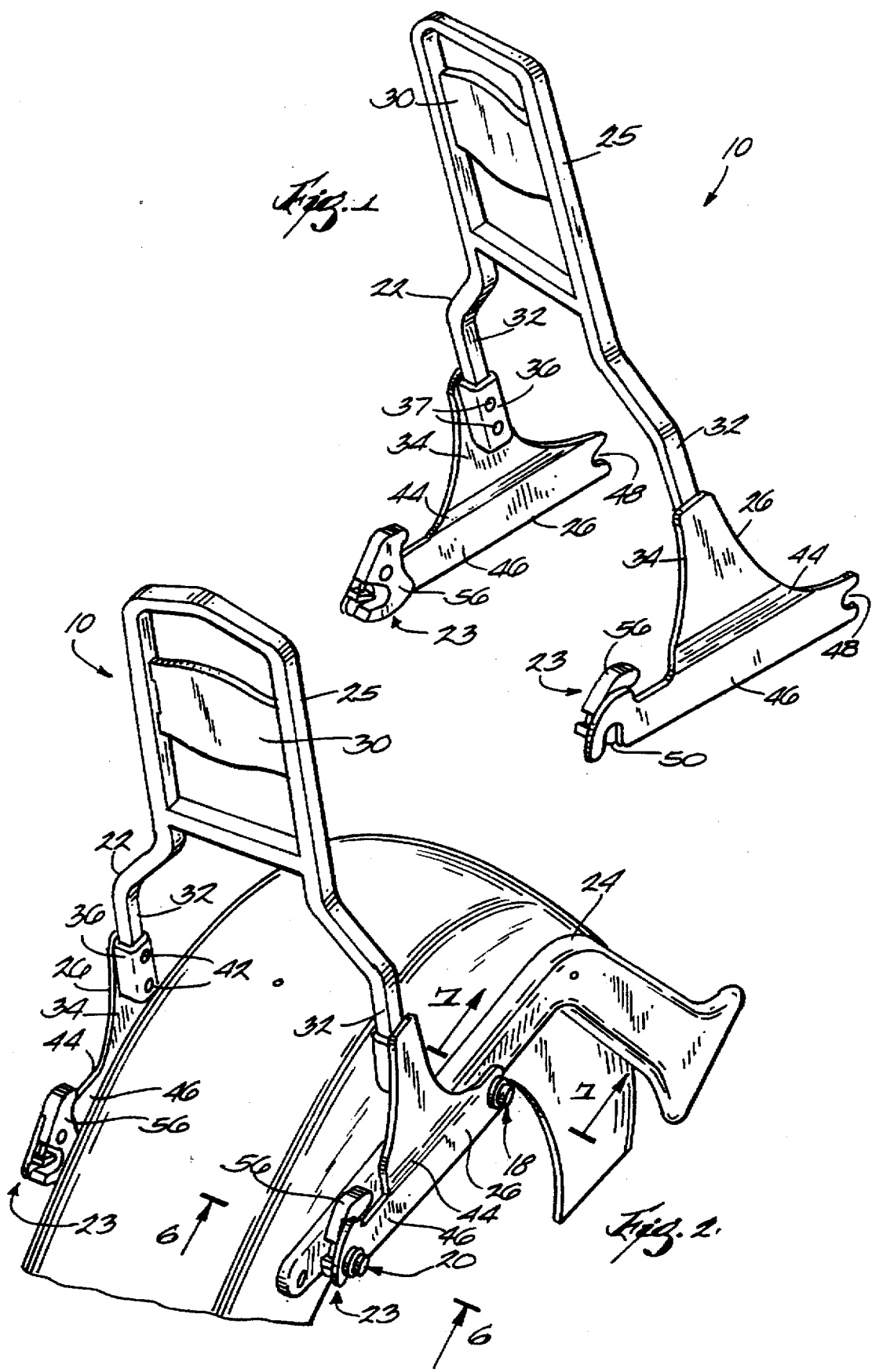

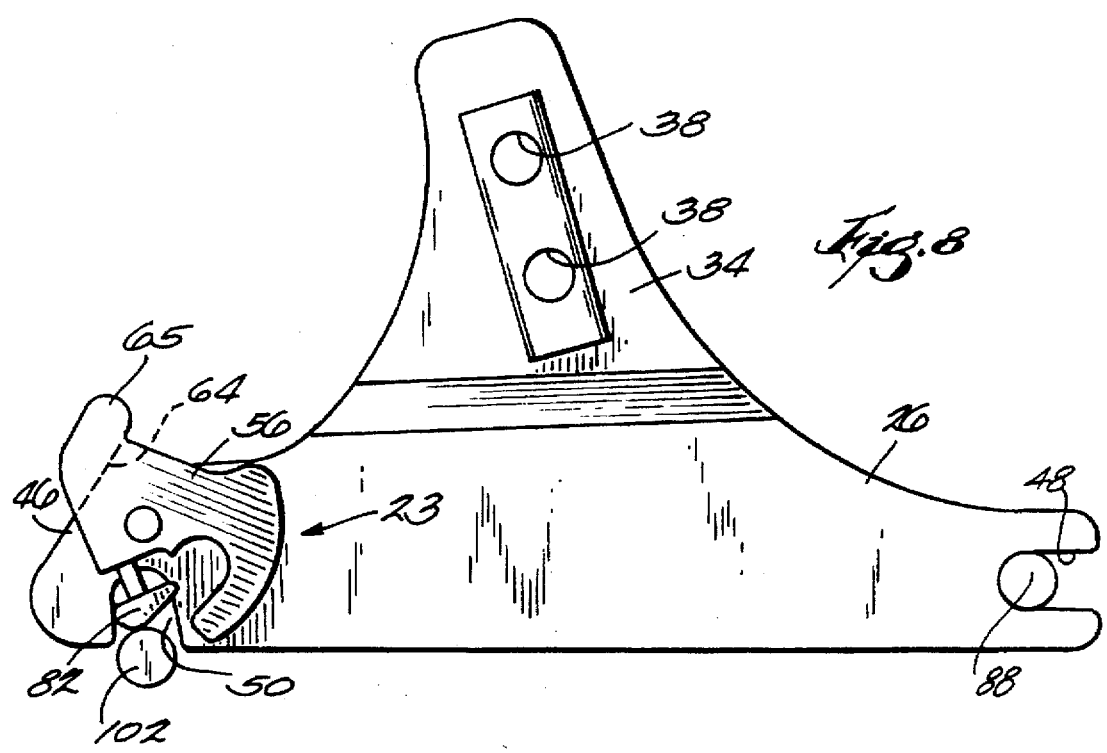
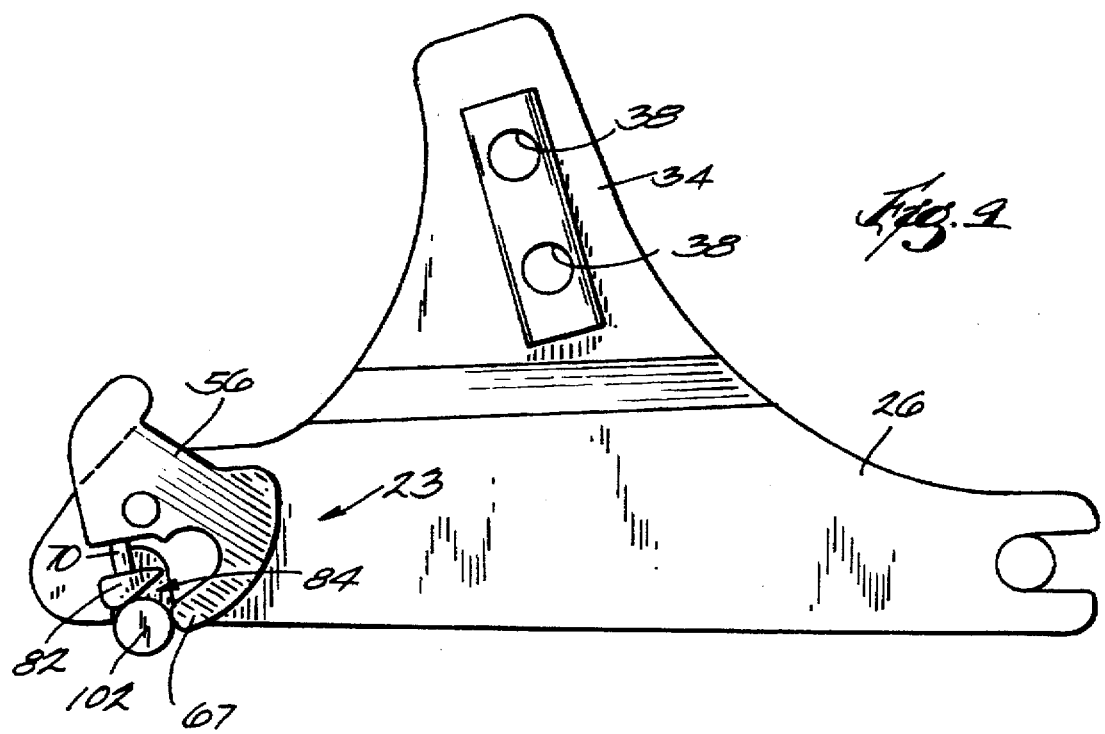

DETACHABLE SISSY BAR

CROSS-REFERENCE TO RELATED APPLICATION

This application is related to co-pending U.S. application Ser. No. 08/504,919, filed Jul. 20, 1995, and entitled "Detachable Luggage Carrier."

FIELD OF THE INVENTION

The present invention generally relates to the field of sissy bars (i.e., backrests) for motor vehicles (e.g., motorcycles). More specifically, the present invention relates to sissy bars that can be installed and removed without the need for tools.

BACKGROUND OF THE INVENTION

Sissy bar is the term commonly used to describe a backrest commonly mounted behind a motorcycle rider or passenger seat by means of fasteners such as nuts and bolts.

It is sometimes desirable to remove a sissy bar to make more room for a passenger or for cargo, for example, and later reinstall it for passenger comfort. Conventional fasteners have the disadvantage of being tedious and time consuming and require tools which may not always be readily available. As a result, riders are discouraged from removing and later reinstalling sissy bars.

U.S. Pat. No. 4,993,731 to Fuller attempts to improve the above-described sissy bars by providing a sissy bar that does not require tools for installation and removal. However, the sissy bar disclosed in the Fuller patent is difficult to install since it requires that locking cams at the opposite sides of the sissy bar be manually held in the unlocked position against the force of biasing springs, while pivoting the sissy onto or off of the mounting bosses. Because sissy bars tend to be relatively heavy and awkward, holding the locking cam in the unlocked position for an extended period of time while holding the sissy bar can be a difficult task.

SUMMARY OF THE INVENTION

The present invention solves the above-noted problems by providing a sissy bar that can be installed onto and removed from a mounting means (e.g., a mounting boss on a motorcycle) without the need for tools, and without the need for exerting substantial physical efforts while attaching or removing the sissy bar. The sissy bar of the present invention generally includes a sissy bar and a latching means mounted on the sissy bar for automatically securing the sissy bar to the mounting means upon movement of the sissy bar toward the mounting means.

The sissy bar includes a base member having an engaging portion engageable with the mounting means, and the latching means includes a latch member movably secured to the base member. The latch member is movable relative to the base member between an unlatched position, in which the engaging portion is engageable and disengageable with the mounting means, and a latched position, in which the engaging portion is held into engagement with the mounting means. The latching means further includes a locking member movable relative to the latch member between an unlocked position, in which the latch member is movable between the latched and unlatched positions, and a locked position, in which the latch member is held in the latched position. By virtue of the provision of a locking member, the above-described latch member is secured in the latched position until the locking member is moved to the unlocked position.

In one embodiment, the latch member is pivotally mounted to the base member. Preferably, the latch member includes an opening for receiving the mounting means, the opening being larger than the mounting means. The locking member can be positioned adjacent to the opening such that the locking member at least partially blocks the opening when the locking member is in the locked position.

The locking member can be movably mounted to the latch member, and is preferably slidably mounted to the latch member. In this regard, if the locking member is slidably mounted, the locking member can include a shaft portion and an enlarged head portion. For example, the shaft portion can slide relative to the latch member along an axis, and the head portion can include a camming surface positioned at an angle that is oblique to the axis. Preferably, the locking member is biased toward the locked position.

In another aspect, the present invention is embodied in a method of attaching a sissy bar assembly to a motorcycle having a mounting boss. The sissy bar assembly includes a base member, a sissy bar secured to the base member, and a latch device having a latch member movably secured to the base member. The method comprises the steps of moving the base member toward the mounting boss with the latch member in an unlatched position, contacting the latch device with the mounting boss, continuing to move the base member toward the mounting boss after the latch member has contacted the mounting boss, and moving (e.g., rotating) the latch member relative to the base member to a latched position to hold the base member into engagement with the mounting boss In one embodiment, the latch device includes a locking member. In this embodiment, the method further comprises, after the step of moving the latch member, the step of moving the locking device to a locked position to prevent movement of the latch member to the unlatched position. In addition, the step of contacting the latch device can comprise the step of contacting the locking member with the mounting boss. The step of moving the locking device preferably comprises the step of sliding the locking device relative to the latch member.

BRIEF DESCRIPTION OF THE DRAWINGS

FIG. 1 is a perspective view of a sissy bar assembly embodying the present invention.

FIG. 2 is a side view of the sissy bar assembly illustrated in FIG. 1 mounted on a motorcycle.

FIG. 8 is side view of the left side plate prior to attachment with the mounting boss.

FIG. 9 is side view of the left side plate with the locking device slightly compressed and the latch member slightly rotated.

DETAILED DESCRIPTION

Figure 5:
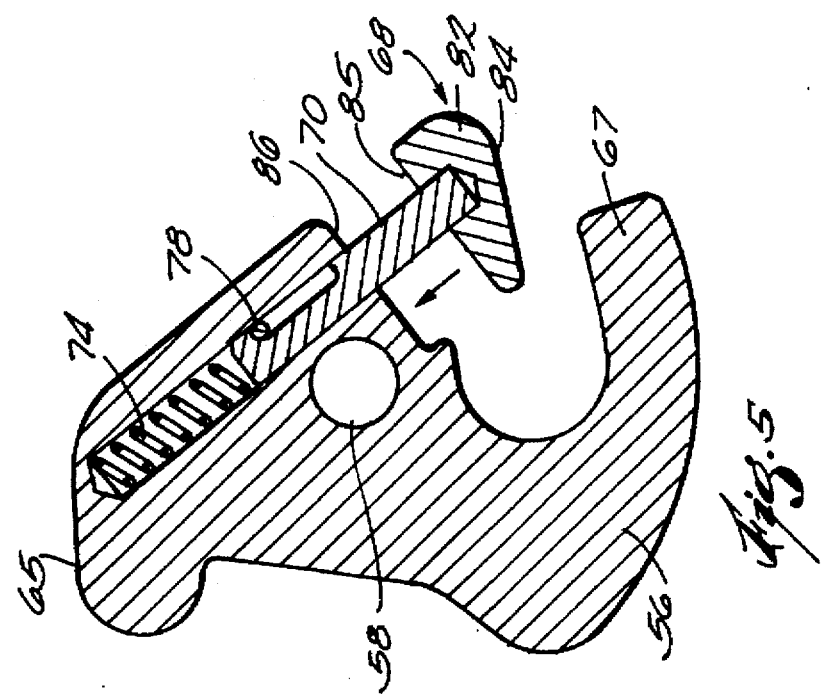
FIG. 5 is a side section view of the right side latch taken along line 5—5 FIG. 3.
Figure 3:
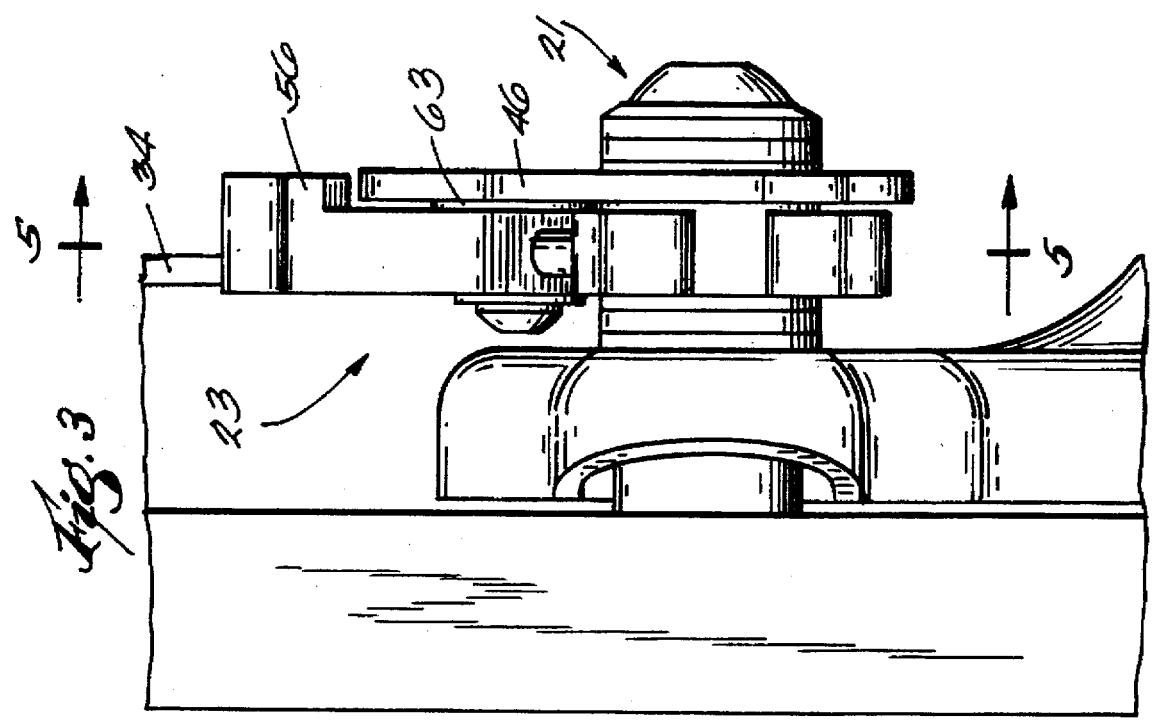
FIG. 3 is an enlarged rear view of a right side latch.

FIGS. 1 and 2 illustrate a sissy bar assembly 10 embodying the present invention. The illustrated sissy bar assembly 10 is adapted to be installed on a motorcycle having front and rear mounting means 18 and 20 for releaseably supporting a sissy bar. The sissy bar assembly 10 includes a sissy bar 22 and latching means consisting of latching assemblies 23 mounted on each of the lateral sides of the sissy bar 22 for automatically securing the sissy bar 22 to mounting means 18 and 20 extending from the motorcycle frame 24 upon pivotal movement of the sissy bar 22 about the rear mounting means 18 and toward the front mounting means 20. As used herein, the term "automatically" means that the latching means 23 is designed such that the sissy bar 22 need only be pivoted toward the rear mounting means 20 in order to cause the latching assemblies 23 to engage. That is, there is no need to manually move or release the latching assemblies 23 in order to secure the sissy bar 22 to the mounting means 18 and 20.

The illustrated sissy bar 22 includes a sissy bar member 25 and a base portion in the form of side plates 26 for supporting the sissy bar member 25. The illustrated sissy bar member 25 includes a back support or backrest portion 30 and two leg portions 32 extend downwardly from the support portion 30 to provide a means for securing the sissy bar member 25 to the side plates 26.

Each of the side plates 26 includes an upper portion 34 having a mounting bracket 36 for receiving a leg portion 32 of the sissy bar 22. The leg portions 32 may be secured in brackets 32 in any suitable manner, such as screws 37 which pass through openings 38 in bracket 36 and are threadably received in aligned threaded holes in the corresponding leg portions 32.

The side plates 26 each further include an intermediate portion 44 extending downwardly and obliquely outwardly from a lower edge of the upper portion 34. The intermediate portions 44 provide a desired offset to accommodate the latch assemblies 23, as described below in more detail.

Figure 6:
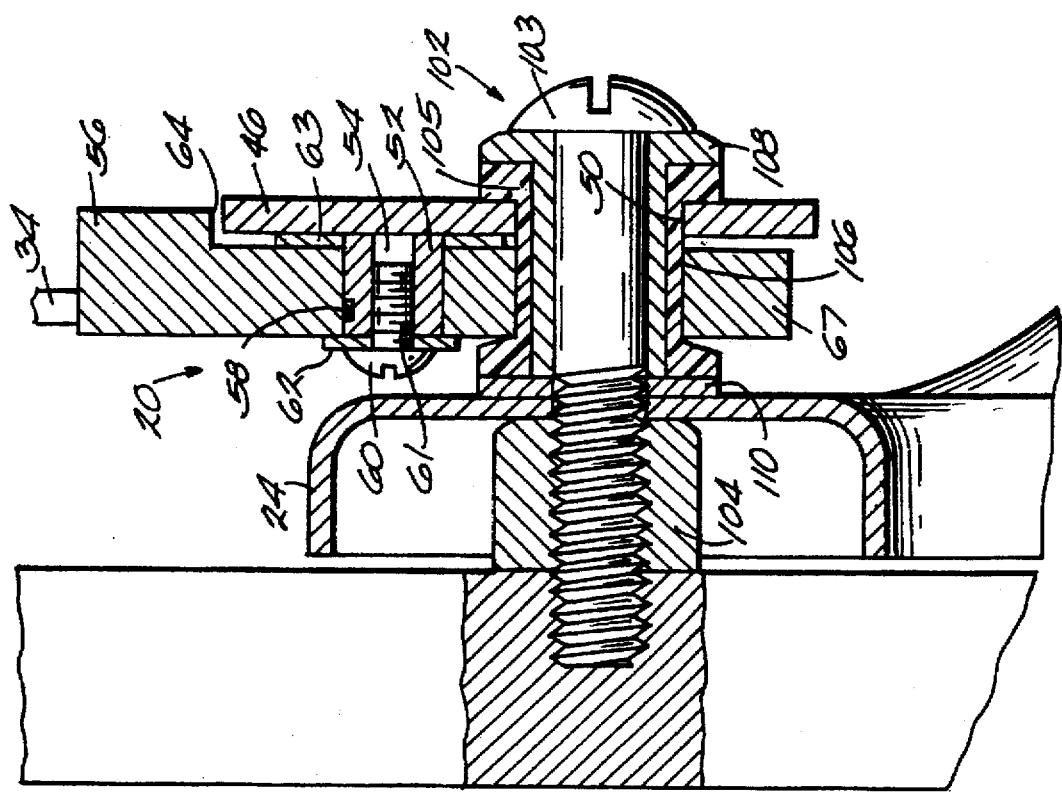
FIG. 6 is a section view of the rear mount taken along line 6—6 in FIG. 2.
Figure 10:
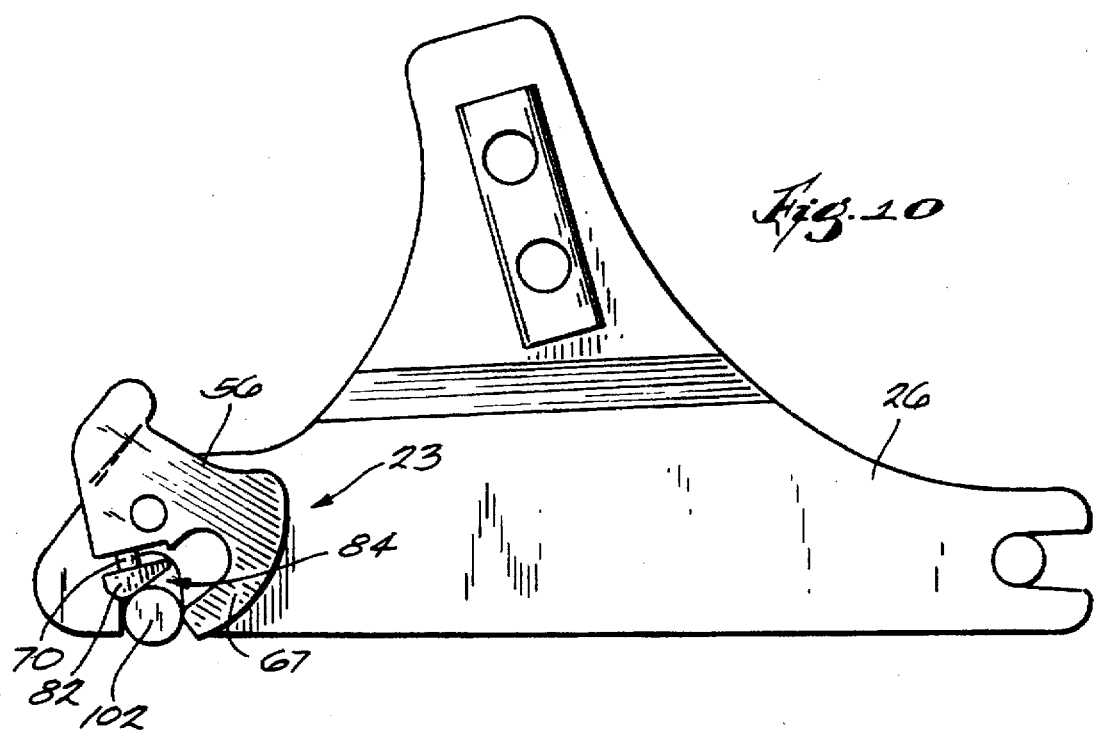
FIG. 10 is side view of the left side plate with the locking device father compressed and the latch member slightly rotated.
Figure 11:
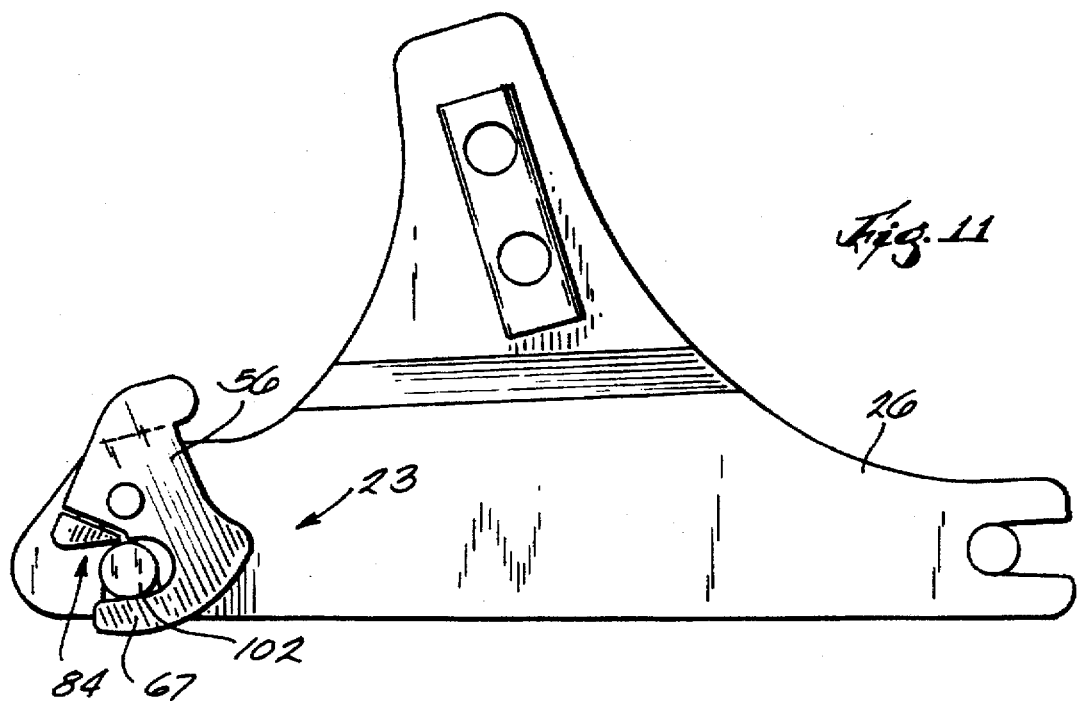
FIG. 11 is side view of the left side plate with the locking device fully compressed and the latch member rotated toward a locked position.

Lower portions 46 of the side plates 25 extend downwardly from the lower edge of each intermediate portion 44 and each is generally vertically oriented relative to the motorcycle frame 24. A forwardly-facing, C-shaped recess 48 is formed on the front end of the lower portion 46 and a downwardly-facing, inverted U-shaped rear recess 50 is formed on a rear thereof. Referring to FIG. 6, a cylindrical pivot member 52 is secured to and extending laterally inwardly each lower portion 46 and each has a cylindrical outer surface for pivotally supporting a latching means 23, as described below.

Each latching assembly 23 includes a latch member 56 pivotally mounted on the rear end of bar for movement between an unlatched position, in which the lower portions 46 are engageable and disengageable with the front mounting means 18, and a latched position, in which the lower portions 46 are held in engagement therewith. Each latching assembly 23 further includes a locking device 68 movable relative to the latch member 56 between an unlocked position, in which the latch member 56 is movable between its latched and unlatched positions, and a locked position, in which the latch member 56 is held in its latched position.

Figure 4:
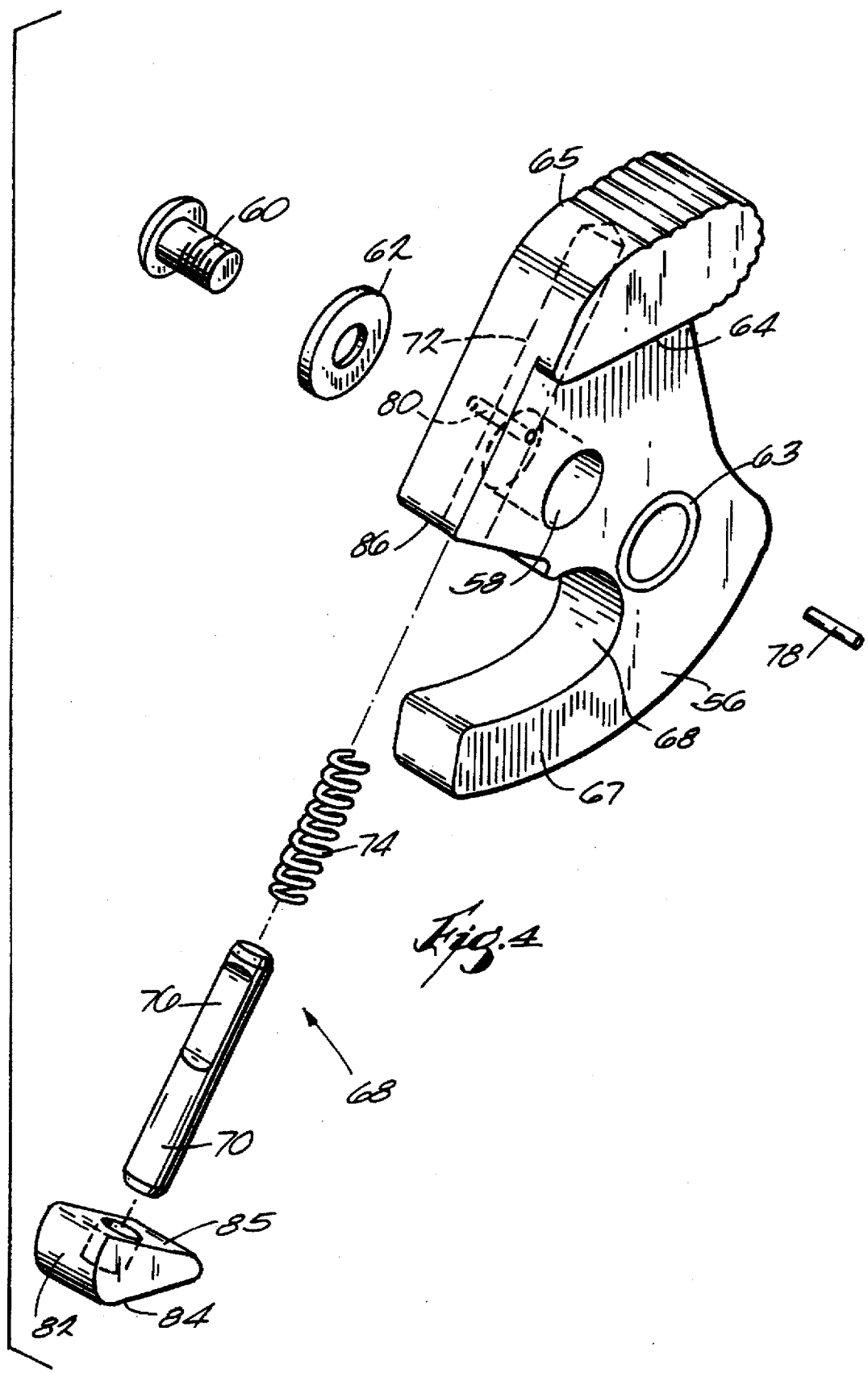
FIG. 4 is an exploded perspective view of the right side latch.

The latch member 56 has a pivot opening 58 complementary to the mounting member 52 on the corresponding lower portion 46 and is retained thereon by a screw 60 threaded into a threaded axial bore 61 in member 52 and a washer 62. A spring washer 63 may be positioned between each latch member 56 and the lower portion 46. As seen in FIG. 4, each latch member 56 includes an overhanging lip 64 that interacts with the corresponding lower portion 46 to limit rotation of the latch member 56 in both directions. A manually engageable portion 65 may be provided with serrations 66 to facilitate engagement of the latch member 56 by the user. Each latch member 56 further includes a hook portion 67 having a C-shaped latching surface 68 for latching the mounting means 12 within the rear recess 50, as will be described below.

Each locking device 68 includes a rod-like plunger member or shaft portion 70 and a head member or cam portion 71 suitably fixed to one end of member 70. The other end of plunger 70 is received for axial movement within a bore 72 formed in the latch member 56 and on the side of pivot opening 58 opposite the latching surface 68. A biasing spring 74 is positioned between the end of the plunger member 70 and the inner end of the bore 72 to bias the plunger member 70 outwardly. In the illustrated embodiment, the biasing spring 74 comprises a coil compression spring. The plunger member 70 includes the flattened keyway 76 designed to engage a pin 78 that laterally protrudes through a lateral opening 80 in bore 72 in the latch member 56. The interaction between the pin 78 and the keyway 76 prevents the plunger member 70 from exiting the bore 72.

The cam member 71 includes a cam surface 84 formed on its lower surface and at an oblique angle relative to a longitudinal axis 86 of the plunger member 70. The camming surface is designed to engage a mounting boss on the motorcycle frame 24 thereby rotating the latch member 56 about pivot member 52 and to a latched position, as described below in greater detail. The upper surface 85 of cam member 74 is generally planer and is complementary to a planer surface 86 formed in the forward end of latching member 56.

Figure 7:
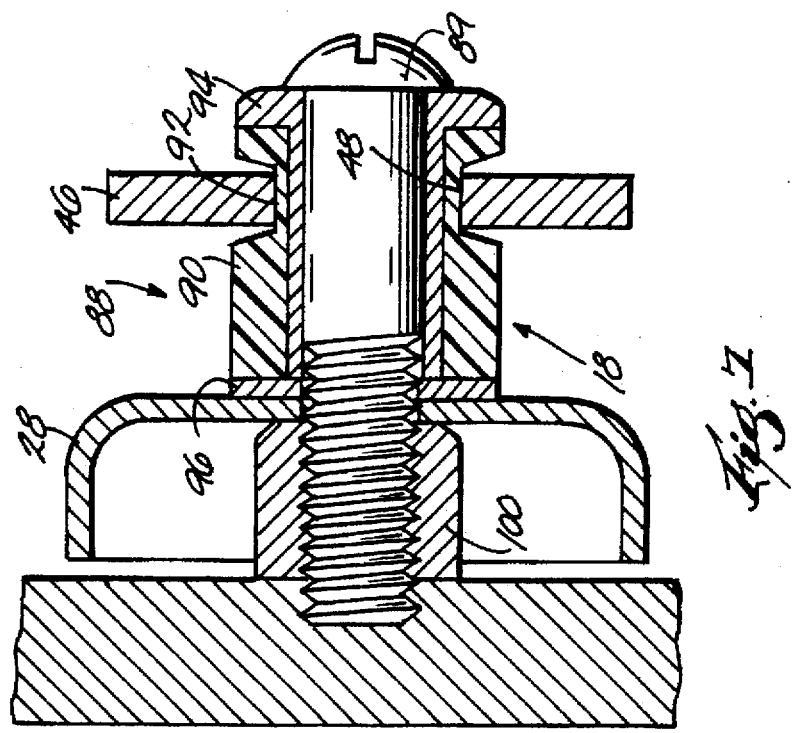
FIG. 7 is a section view of a front mount taken along line 7—7 in FIG. 2.

The recesses 48 and 50 in the front and rear ends of lower portion 46 are positioned to respectively engage mounting means 18 and 20 positioned in a spaced apart relation in any suitable portion of the motorcycle, such as the frame 24. More specifically, referring to FIG. 7, the illustrated mounting means 12 includes two front mounting bosses 88 each constructed and arranged to receive a corresponding front recess 48. Each front mounting boss 88 includes a threaded stud 89 and a surrounding sleeve 90 made from any suitable polymer material, such as Delrin. The sleeve 90 includes a reduced diameter neck portion 92 for receiving the front recess 48. A metallic bushing 94 is positioned between the front sleeve 90 and the stud 89. A washer 96 is positioned between the end of the sleeve 90 and the motorcycle frame 24. The stud 89 may be secured to the motorcycle frame 28 portion in any suitable manner such as by a nut 100.

The illustrated mounting means 20 includes two rear mounting bosses 102 designed to accommodate rear recesses 50 and corresponding latch assemblies, as shown in FIG. 6. Each rear mounting boss 102 includes a threaded stud 103 which is secured to the frame 24 by a nut 104. A sleeve 105 surrounds the stud 103 and may also be formed of any suitable polymer material, such as Delrin. The sleeve 105 includes a reduced diameter neck portion 106 for receiving the rear recess 50 and the corresponding latching assembly 23. A bushing 108 is positioned between the sleeve 104 and the stud 103, and a washer 110 is positioned between the end of sleeve 104 and the motorcycle frame 24.

FIGS. 8–12 illustrate the manner in which the above-described sissy bar assembly 10 is mounted onto front and rear mounting bosses 88, 102 of a motorcycle. First, the front recesses 48 are engaged with the front mounting bosses 88. With the front recesses 48 fully seated into the front mounting boss 88, the rear recesses 50 will be aligned with the rear mounting bosses 102, as illustrated in FIG. 8. The latch members 56 are then positioned by pulling back on the engaging portions 65 until the lips 64 contact the lower portions 46.

Next, the assembly is pivoted downwardly about the front mounting bosses 88 until the cam surfaces 84 of the cam members 82 contact the rear mounting bosses 102. The reaction force of spring 74 creates clockwise moments on latch members 56 which rotates until the leading edge of hook portion 67 engages the rear mounting boss 102. Subsequent downward movement of the lower portions 46 results in compression of the spring 74 until the planer surface 85 of the cam member 82 engages the surface 86 on latch member 56. At this point, the cam surface 84 forms a continuation of the latch surface 68 so that the latching member is free for further clockwise rotation under the influence of compression of spring 74. Further downward movement of the rear side plate 27 causes further clockwise rotation of the latch member 56 until the hook portion 67 below the rear mounting boss 102 and the cam surface 84 no longer contacts the rear mounting boss 102. At this point, the plunger member 70 is forced back to its fully-extended position under the influence of the biasing spring 74.

Figure 12:
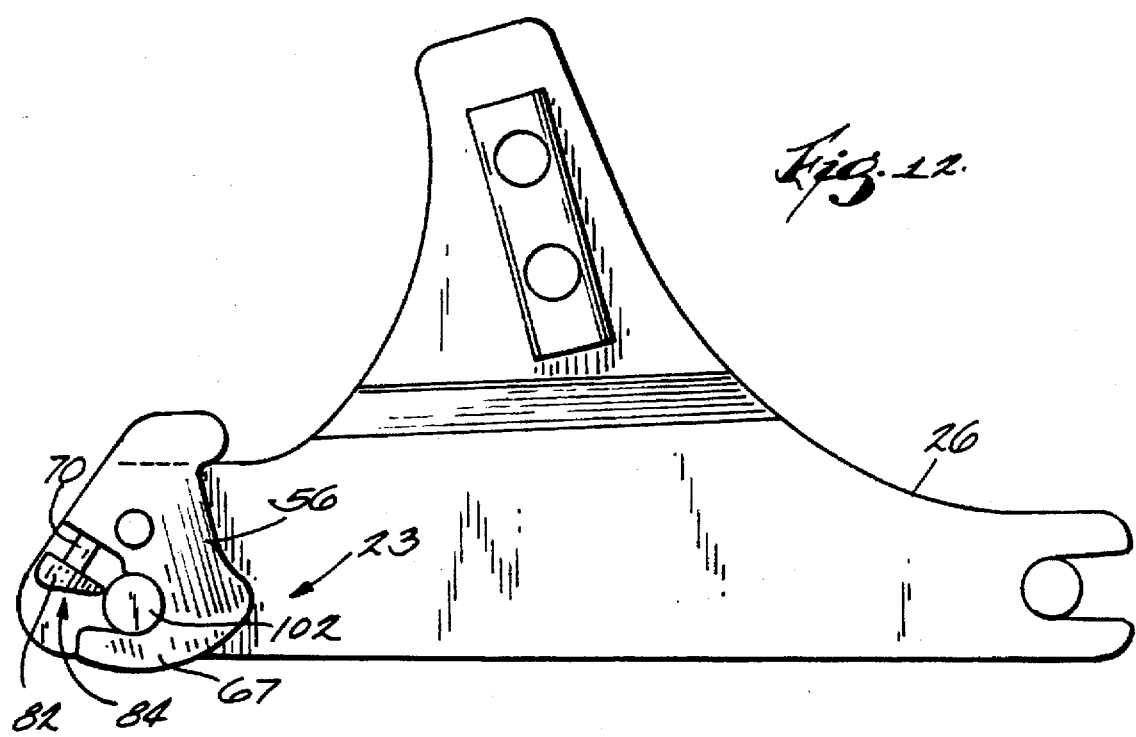
FIG. 12 is side view of the left side plate with the locking device in a locked position and the latch member in a latched position.

With the latch member 56 positioned on the rear mounting boss 102 as illustrated in FIG. 12, it can be seen that the latch member 56 is prevented from rotating counter clockwise due to the interference between the cam member 82 and the rear mounting boss 102. Accordingly, the side plates 26 are rigidly secured to the mounting bosses. To remove the sissy bar assembly 12 from the motorcycle, the cam members 82 are moved upwardly until each engages one of the surfaces 86 and the latch members 56 are subsequently rotated counter clockwise until the hook portion 67 on the latch members 56 no longer interfere with removal of the side plates 26 from the rear mounting boss 102.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A sissy bar assembly adapted to be removably installed on a motorcycle, said sissy bar assembly comprising:
    a first mounting member adapted to be connected to said motor cycle;
    a second mounting member adapted to be connected to said motor cycle;
    a backrest portion;
    at least one pivot support connected to said backrest portion and adapted to detachably engage the first mounting member;
    at least one latching support connected to said backrest portion and spaced from said pivot support and adapted to engage the second mounting member;
    a latching member movably mounted on said latching support, and moveable between a latched position, where said latching support is secured to the second mounting member, and an unlatched position; and
    a locking member moveable relative to said latching member, and moveable between a locked position and an unlocked position, wherein said latching member is prohibited from moving from said latched position to said unlatched position by said locking member in said locked position.

2. The sissy bar assembly set forth in claim 1, wherein said latching member includes a lip engageable with said latching support to limit movement of said latching member relative to said latching support.

3. The sissy bar assembly set forth in claim 1, wherein said locking member is mounted on said latching member.

4. The sissy bar assembly set forth in claim 3, wherein said locking member is movable linearly relative to said latching member.

5. The sissy bar assembly set forth in claim 1, wherein said locking member is biased toward said locked position.

6. The sissy bar assembly set forth in claim 1, wherein said locking member includes a cam portion engageable with the second mounting member, whereby said latching member is urged toward the latched position upon contact of said cam portion with the second mounting member.

7. The sissy bar assembly set forth in claim 1, wherein said locking member includes a cam portion engageable with the second mounting member, whereby said locking member is urged toward the unlocked position upon contact of said cam portion with the second mounting member.

8. The sissy bar assembly set forth in claim 1, wherein said latching member includes a latching surface adapted to receive the second mounting member, and wherein said locking member is positioned adjacent to said latching surface, whereby said locking member will prevent separation of said latching surface from the second mounting member when the second mounting member is received by said latching surface and when said locking member is in said locked position.

9. The sissy bar assembly as set forth in claim 1, wherein said locking member includes a shaft portion movably mounted on said latching member and a cam portion attached to said shaft portion.

10. The sissy bar assembly as set forth in claim 1 wherein said latching member moves freely relative to said latching support.

11. The combination of a motorcycle and a sissy bar assembly removably mounted on said motorcycle, said combination including:
    a first mounting member connected to said motorcycle;
    a second mounting member connected to said motorcycle in spaced relation to said first mounting member;
    a pivot support detachably connected to said first mounting member;
    a latching support detachably connected to said second mounting member;
    a backrest portion connected to said pivot support and to said latching support;
    a latching member movably mounted on said latching support, and moveable between a latched position, where said latching support is secured to said second mounting member, and an unlatched position; and
    a locking member moveable relative to said latching member, and moveable between a locked position and an unlocked position, wherein said latching member is prohibited from moving from aid latched position to said unlatched position by said locking member in said locked position.

12. The combination set forth in claim 11, wherein said latching member includes a lip engageable with said latching support to limit movement of said latching member relative to said latching support.

13. The combination set forth in claim 11, wherein said locking member is mounted on said latching member.

14. The combination set forth in claim 13, wherein said locking member is movable linearly relative to said latching member.

15. The combination set forth in claim 11, wherein said locking member is biased toward said locked position.

16. The combination set forth in claim 11, wherein said locking member includes a cam portion engageable with said second mounting member, whereby said latching member is urged toward the latched position upon contact of said cam portion with said second mounting member.

17. The combination set forth in claim 11, wherein said locking member includes a cam portion engageable with said second mounting member, whereby said locking member is urged toward the unlocked position upon contact of said cam portion with said second mounting member.

18. The combination set forth in claim 11, wherein said latching member includes a latching surface adapted to receive said second mounting member, wherein said locking member is positioned adjacent to said latching surface, whereby said locking member will prevent separation of said latching surface from said second mounting member when said second mounting member is received by said latching surface and when said locking member is in said locked position.

19. The combination as set forth in claim 11, wherein said locking member includes a shaft portion movably mounted on said latching member and a cam portion attached to said shaft portion.

20. The sissy bar assembly as set forth in claim 11 wherein said latching member moves freely relative to said latching support.

* * * * *

UNITED STATES PATENT AND TRADEMARK OFFICE
CERTIFICATE OF CORRECTION

PATENT NO. : 5,667,232
DATED : September 16, 1997
INVENTOR(S) : Donald Michael Gogan, Stephen L. Galbraith, and Geoffrey Thomas Williams It is certified that error appears in the above-indentified patent and that said Letters Patent is hereby corrected as shown below:

Column 2, line 63, delete "father" and insert --further--.
Column 4, line 35, delete "planer" and insert --planar--; and
line 36, delete "planer" and insert --planar--.

Column 5, line 12, delete "moment" and insert --movement--; and
line 16, delete "planer" and insert --planar--.

Column 5, Claim 1, line 4, delete "motor cycle" and insert --motorcycle--; and
line 6, delete "motor cycle" and insert --motorcycle--.

Column 8, Claim 20, line 1, delete "The sissy bar assembly" and insert --The combination--.

Signed and Sealed this

Thirtieth Day of December, 1997

Attest:

BRUCE LEHMAN

Attesting Officer     Commissioner of Patents and Trademarks

UNITED STATES PATENT AND TRADEMARK OFFICE
Certificate

Patent No. 5,667,232                                                                        Patented: September 16, 1997

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Donald Michael Gogan, Brookfield, WI (US); Stephen L. Galbraith, Mequon, WI (US); Geoffrey Thomas Williams, Mequon, WI (US); David Fernandez, Viejo, CA (US); and Donald R. Markland, Laguna Beach, CA (US).

Signed and Sealed this Twentieth Day of September 2011.

PAUL DICKSON
*Supervisory Patent Examiner*
Art Unit 3616
Technology Center 3600